(12) United States Patent
Sugano

(10) Patent No.: US 7,914,160 B2
(45) Date of Patent: Mar. 29, 2011

(54) PROJECTION TELEVISION

(75) Inventor: Norichika Sugano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 63 days.

(21) Appl. No.: 11/878,408

(22) Filed: Jul. 24, 2007

(65) Prior Publication Data
US 2008/0186606 A1   Aug. 7, 2008

(30) Foreign Application Priority Data
Feb. 2, 2007  (JP) ................. 2007-023963

(51) Int. Cl.
G02B 7/182 (2006.01)
G03B 21/28 (2006.01)

(52) U.S. Cl. ............ 359/871; 353/77; 353/98; 348/782; 348/832

(58) Field of Classification Search .................. 359/871; 348/782, 832; 353/77, 98
See application file for complete search history.

(56) References Cited

U.S. PATENT DOCUMENTS

| | | | | |
|---|---|---|---|---|
| 2,299,657 A * | 10/1942 | Rystedt | ............................. | 353/72 |
| 2,476,494 A * | 7/1949 | Jones et al. | .................... | 348/789 |
| 2,685,817 A * | 8/1954 | Freeman | ........................ | 359/449 |
| 2,754,722 A * | 7/1956 | Howell et al. | ................... | 353/37 |
| 2,944,461 A * | 7/1960 | Howell et al. | ................... | 353/37 |
| 3,561,860 A * | 2/1971 | Rudolph | .......................... | 353/77 |
| 3,825,218 A * | 7/1974 | Krumbein et al. | ............. | 248/466 |
| 3,872,052 A * | 3/1975 | Fielding et al. | ................ | 524/424 |
| 4,145,840 A * | 3/1979 | Davidson | ........................... | 47/44 |
| 4,386,372 A * | 5/1983 | Slater | .............................. | 348/782 |
| 5,004,336 A * | 4/1991 | Saijo et al. | ..................... | 353/122 |
| 5,506,642 A * | 4/1996 | Suzuki et al. | .................... | 353/74 |
| 5,557,343 A * | 9/1996 | Yamagishi | ...................... | 348/781 |
| 5,669,698 A * | 9/1997 | Veldman et al. | .............. | 362/494 |
| 5,786,933 A | 7/1998 | Iwai et al. | | |
| 5,833,340 A * | 11/1998 | Yoshikawa et al. | .............. | 353/98 |
| 6,419,300 B1 * | 7/2002 | Pavao et al. | .................. | 296/180.1 |
| 6,986,586 B2 * | 1/2006 | Martinez, Sr. | ................. | 359/847 |
| 7,295,370 B2 * | 11/2007 | Kim | ................................ | 359/457 |
| 7,546,995 B2 * | 6/2009 | Axel | ............................... | 248/444 |
| 2002/0186352 A1 | 12/2002 | Chen et al. | | |
| 2007/0013877 A1 | 1/2007 | Tantasirikorn | | |

FOREIGN PATENT DOCUMENTS

| | | | |
|---|---|---|---|
| JP | 05-122643 | * | 5/1993 |
| JP | 3301181 B2 | | 4/2002 |
| JP | 2003-215713 | * | 7/2003 |
| JP | 2004-309529 | * | 11/2004 |
| KR | 2002040307 | * | 5/2002 |
| KR | 2004013322 | * | 2/2004 |
| KR | 2005120034 | * | 12/2005 |
| KR | 2006031251 | * | 4/2006 |

* cited by examiner

Primary Examiner — Ricky D Shafer
(74) Attorney, Agent, or Firm — Birch, Stewart, Kolasch & Birch, LLP

(57) ABSTRACT

A projection television includes: a mirror holder made up of a metal bracket fixed with its one end attached to a cabinet and a mirror holder cover made of synthetic resin having a square-cornered U shape part into which the other end of the bracket is fitted; and a mirror having an edge supported by the mirror holder and changing the optical path of projected light.

8 Claims, 12 Drawing Sheets

F I G . 6
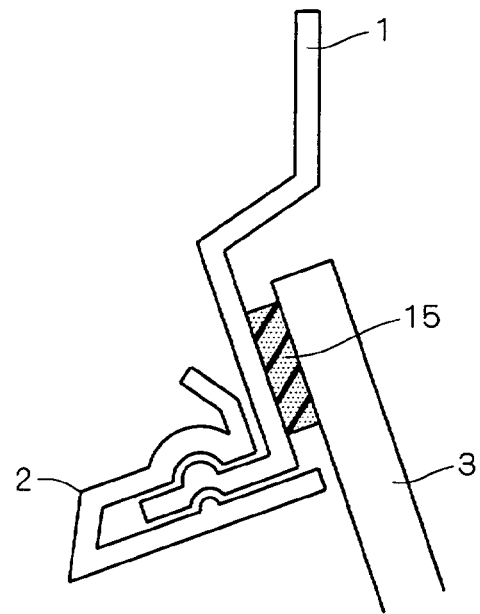
F I G . 7
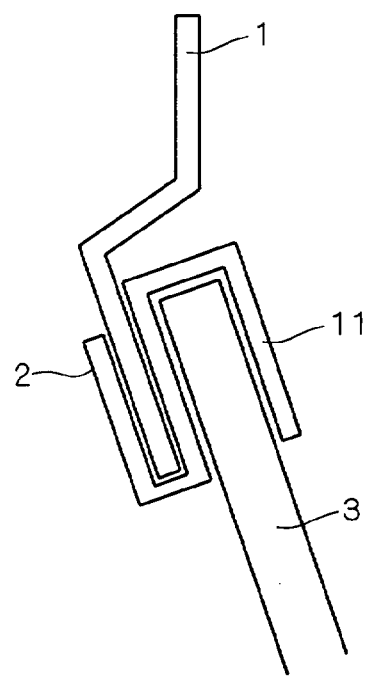

F I G. 1 4
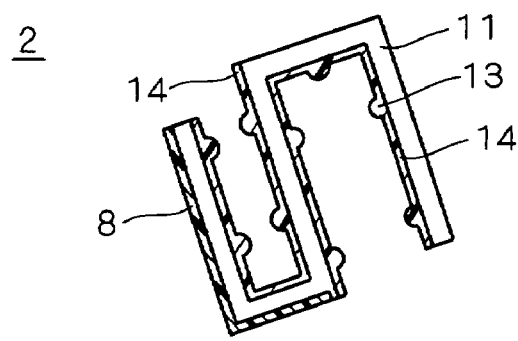
F I G. 1 5
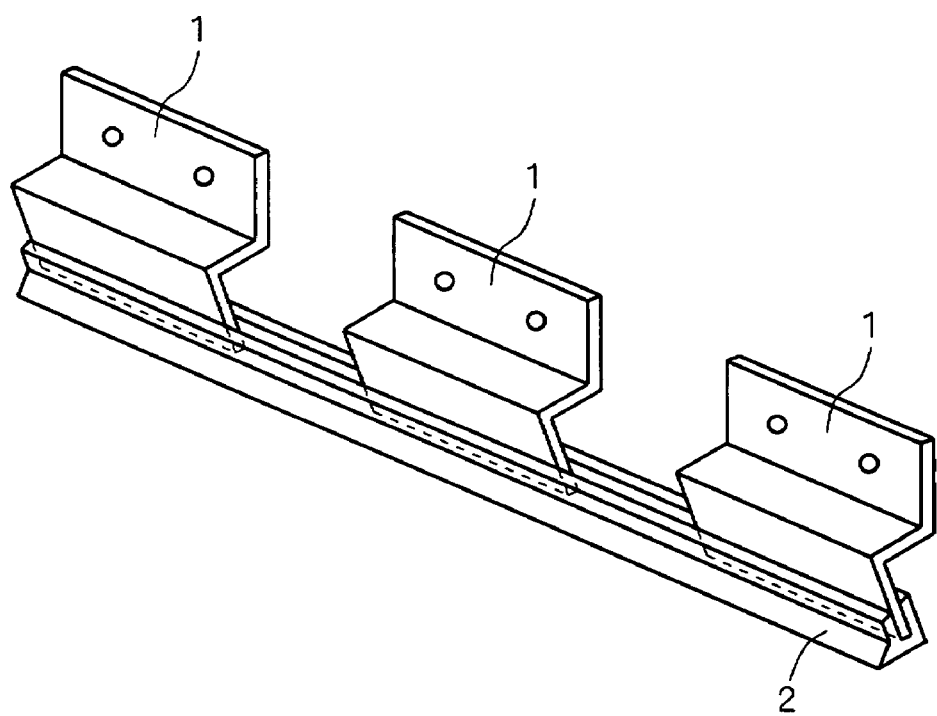

PROJECTION TELEVISION

FIELD OF THE INVENTION

The present invention relates to a technique for mounting a mirror in a projection television.

DESCRIPTION OF THE BACKGROUND ART

In a conventional projection television, a mirror is supported by a metal bracket on the inner surface of a rear cover of a cabinet with a mirror protection pad interposed at a contact portion between the bracket and mirror.

In another conventional projection television, a mirror is supported by a bracket made of synthetic resin to protect the mirror surface without using a pad (e.g., Japanese Patent Application Laid-Open No. 7-120838 (1995)).

In the conventional projection television in which the mirror is held by the metal bracket on the inner surface of the rear cover, direct holding of the mirror made of glass by the bracket may cause damage on the mirror which results in image defects, or flaws caused by a shock, if applied to the mirror or bracket, may result in cracks to damage the mirror. Therefore, a pad for protecting the mirror surface needs to be interposed between the metal bracket and mirror.

Such pad, however, has high frictional resistance and thus causes the mirror to be kept displaced from its original position, which in turn causes image distortions. There is a pad of low frictional resistance, but results in high costs because of its less availability, difficulty in machining and expensive raw materials. Further, some pads of low frictional resistance are easily scratched. Such a pad is scratched when a frictional force is applied between the mirror and pad, and resultant shavings may be adhered to the mirror and the like to cause image defects. In the case of attaching a pad, the pad may interfere with an image when the accuracy of attachment is low, which causes image defects and makes the assembly procedure complicated because of the additional step of attaching the pad.

A metal bracket is superior in strength and minimizes displacements of the mirror, but is disadvantageous in the likelihood of reflecting light. Reflected light from the bracket gives rise to image disturbance. To reduce such reflection, the bracket needs to be subjected to surface treatment such as coating, or an additional mechanism for limiting the direction of reflection needs to be provided, which results in high costs because of the difficulty in producing such bracket due to its complicate shape, difficulty in keeping the shape within tolerances, and the like.

The use of a bracket made of synthetic resin instead of the metal bracket eliminates the need to provide a pad and further, reduces reflection of light, however, such synthetic resin bracket is of low strength. A cabinet made of wood, for example, which is strong and resistant to deformation, ensures the strength and raises no problem even with the mirror being held by a bracket of low strength made of, e.g., synthetic resin. However, a cabinet made of, e.g., synthetic resin which is likely to be deformed is too weak to support the weight of the mirror and becomes deformed, which results in image distortions.

SUMMARY OF THE INVENTION

An object of the present invention is to provide a projection television capable of ensuring the strength of a bracket supporting a mirror, preventing the mirror from becoming displaced, damaged or broken by an external shock, and reducing image defects caused by projected light reflected off a position other than the mirror.

According to the present invention, the projection television includes a mirror holder and a mirror. The mirror holder has a bracket made of metal fixed with its one end attached to a cabinet and a mirror holder cover made of synthetic resin having a first square-cornered U shape part into which the other end of the bracket is fitted. The mirror has an edge supported by the mirror holder and changes an optical path of projected light.

The bracket is of high strength, protects the mirror surface, and prevents light from being reflected off the mirror holder.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a sectional view showing the construction of a mirror holder and a mirror according to a fourth preferred embodiment of the present invention;

FIG. 7 is a sectional view showing the construction of a mirror holder and a mirror according to a fifth preferred embodiment of the present invention;

FIG. 14 is a sectional view showing the construction of a mirror holder cover according to a twelfth preferred embodiment of the present invention;

FIG. 15 is a perspective view showing the construction of a mirror holder according to a thirteenth preferred embodiment of the present invention;

DESCRIPTION OF THE PREFERRED EMBODIMENTS

First Preferred Embodiment

Figure 1:
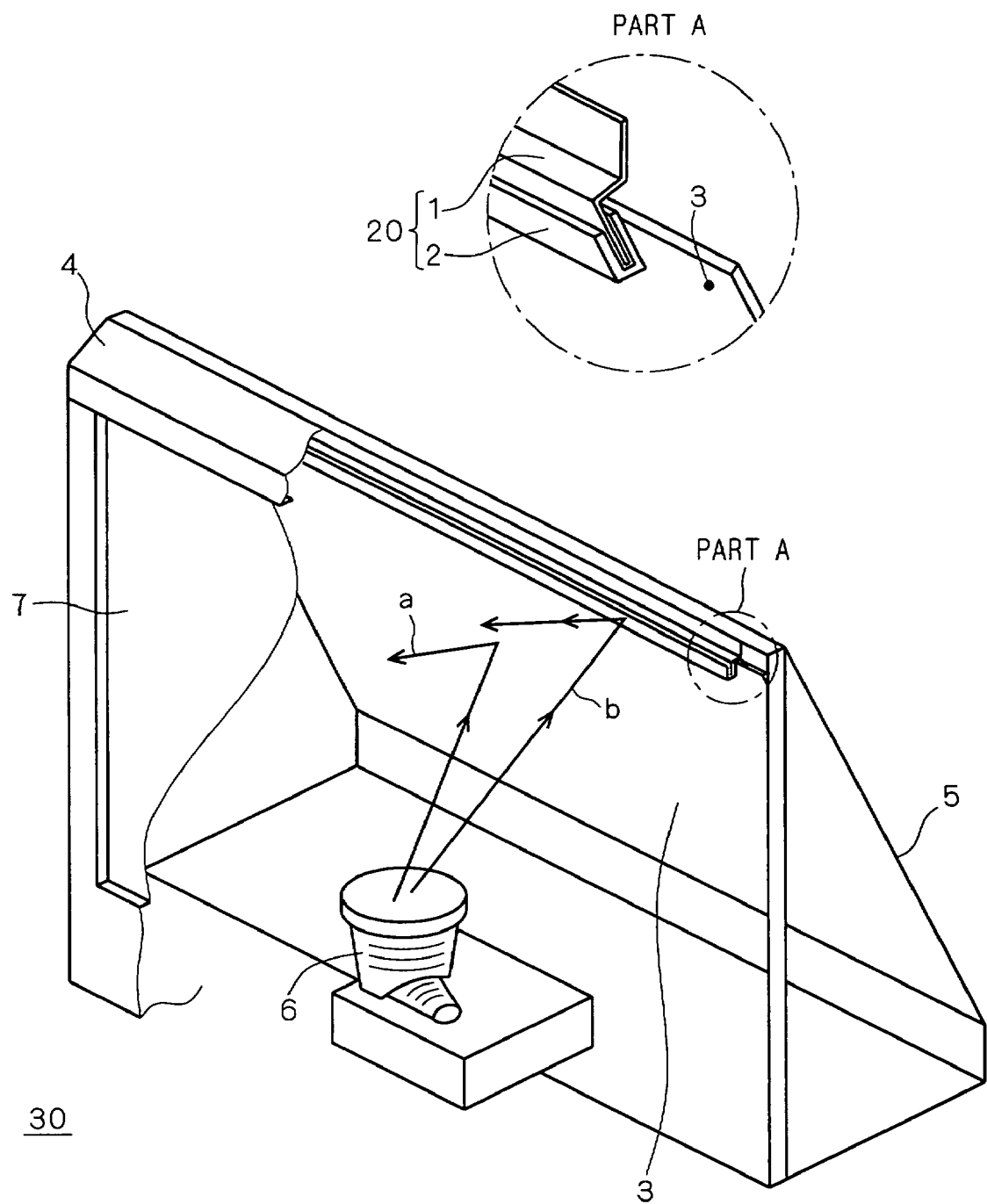
FIG. 1 is a perspective view showing the construction of a projection television according to a first preferred embodiment of the present invention.

FIG. 1 is a perspective view showing the construction of a projection television (TV) 30 according to a first preferred embodiment of the present invention.

The projection TV 30 includes a cabinet made up of a front cabinet 4 and a back cabinet 5, an image display device 6 (e.g., a projector engine of DLP™ type) disposed inside the cabinet, a projection screen 7 fixed to the front cabinet 4, and a mirror 3 made of glass for changing the optical path of light projected from the image display device 6 to be reflected toward the projection screen 7. The mirror 3 is supported by a mirror holder 20, and the mirror holder 20 has a bracket 1 made of metal with its one end fixed to the back cabinet 5 by screws and a mirror holder cover 2 of synthetic resin extruded or injection molded to have a square-cornered U shape part into which the other end of the bracket 1 is fitted. The fitted part of the mirror holder cover 2 is adjusted in dimension, and the bracket 1 and mirror holder cover 2 are press fitted so as not to slide down from each other.

Figure 2:
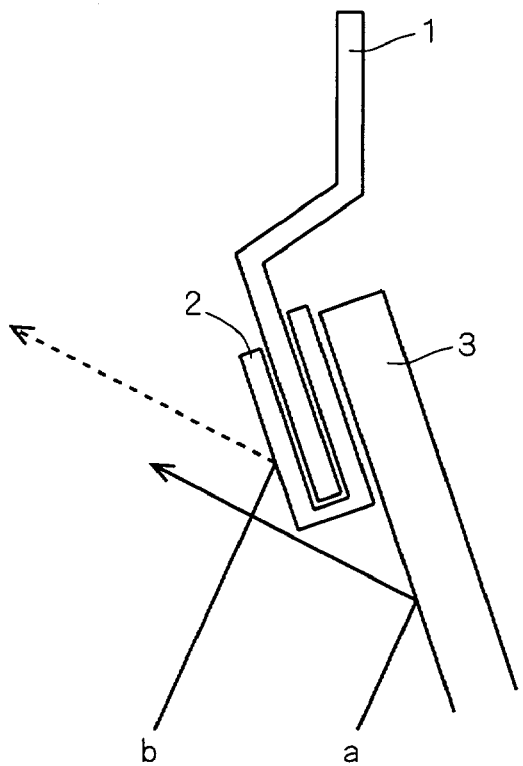
FIG. 2 is a sectional view showing the construction of a mirror holder and a mirror according to the first preferred embodiment.

FIG. 2 is a sectional view showing the construction of the mirror holder 20 and mirror 3 according to the first preferred embodiment. The present invention features providing the mirror holder cover 2 made of synthetic resin to protect the surface of the mirror 3 for shock absorption.

Light beams a and b shown in FIG. 2 indicate part of light projected from the image display device 6. The light beam a is reflected off the mirror 3 to be projected upon the rear surface of the projection screen 7, which can be seen as an image from the front side of the front cabinet 4. Reflection of the light beam b is reduced at the surface of the mirror holder cover 2 made of resin, by which adverse effects upon the image are minimized.

Figure 16:
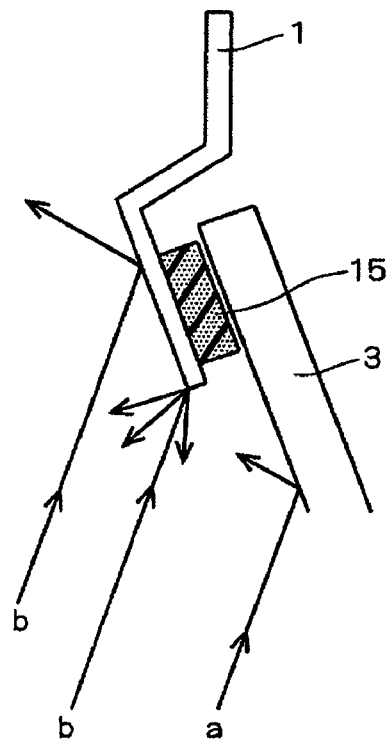
FIGS. 16 to 21 are sectional views each showing the construction of a bracket and a mirror according to conventional techniques.
Figure 17:
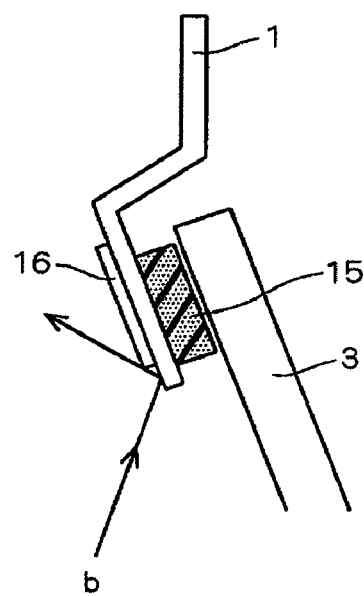
Figure 18:
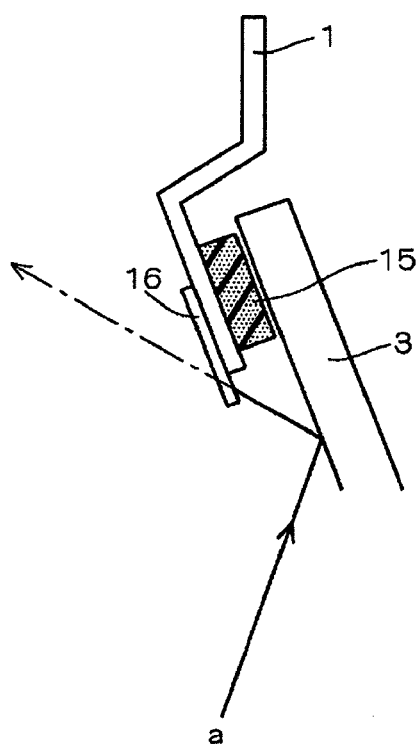
Figure 19:
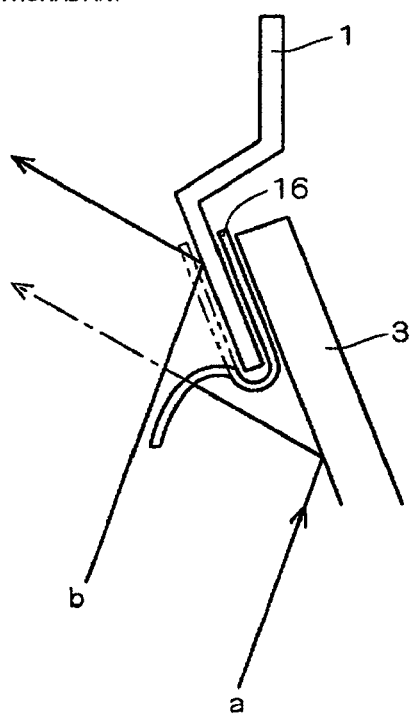
Figure 20:
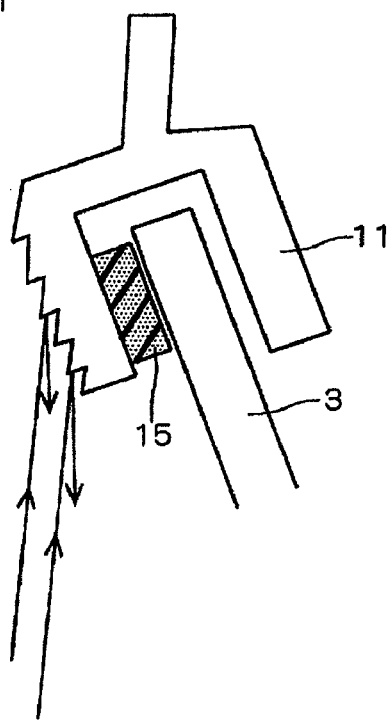
Figure 21:
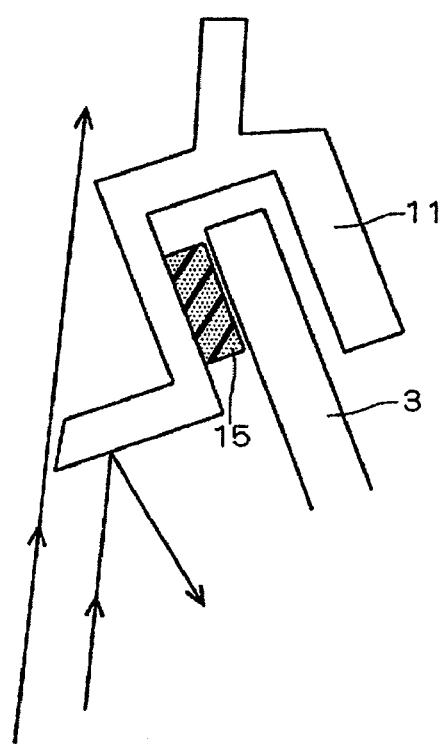

FIGS. 16 to 21 are sectional views each showing the construction of the bracket 1 and mirror 3 according to conventional techniques. In FIGS. 17 to 19, the bracket 1 has an anti-reflection tape affixed thereto. In FIGS. 20 and 21, the bracket 1 has its surface formed into an antireflection shape by processing other than coating, graining, anodization, and the like. As shown in FIGS. 20 and 21, the conventional techniques feature supporting the mirror 3 by the bracket 1 made of metal with a pad 15 interposed therebetween.

When the light beam b is projected on the metal bracket 1 shown in FIG. 16, the bracket 1 reflects light. The bracket 1 is therefore formed not to reflect light toward the projection screen 7 by carrying out surface treatment such as coating or the like, or affixing a tape-like material made of nonwoven fabric or the like thereto in order to reduce reflection of light.

However, the bracket 1 shown in FIG. 16 has drawbacks that coating on its tip portion is likely to come off, coating the tip portion is difficult, and manufacturing steps become complicated and increase in number.

In the case of affixing a tape-like material made of nonwoven fabric or the like, there are adverse effects upon an image caused by: interference with the light beam a when a tape 16 fails to be affixed to the tip portion of the bracket 1 as shown in FIG. 17 or extends off the tip portion of the bracket 1 as shown in FIG. 18; and strong reflection of the light beam b and interference with the light beam a when the tape 16 partially comes off as shown in FIG. 19.

The bracket 1 may be subjected to surface treatment to prevent reflection of light toward the projection screen 7 as shown in FIGS. 20 and 21. To achieve such special shape, an aluminum holder molded by extrusion is generally used; however, aluminum is disadvantageous in high cost and low bending strength for metal, though being suitable for extrusion molding. On the other hand, pressed sheet metal is difficult to be formed into a special shape such as shown in FIG. 20 or 21, though being inexpensive and having high bending strength.

Based on the foregoing description, comparing the mirror holder 20 shown in FIG. 2 and conventional brackets 1 shown in FIGS. 16 to 21, the mirror holder cover 2 according to the present embodiment is formed into a predetermined shape by extrusion molding or injection molding, which does not partially come off to become deformed and which is easy to determine the position to be affixed, resulting in positional stabilization after affixing and easy affixing operation, and further, reduced component costs because the mirror holder cover 2 is obtained at lower cost than the cost of surface treatment such as coating. Furthermore, in the case of machining the surface of the mirror holder cover 2, a special shape is easily formed because of the use of resin. Component costs can further be reduced by using inexpensive pressed sheet metal for the bracket 1.

As described above, the mirror holder cover 2 reduces reflection of projected light and protects the surface of the mirror 3 for shock absorption. The strong mirror holder 20 can therefore be obtained at low cost with improved workability, which prevents reflection of projected light, interference of a tape-like material or a pad with projected light, image distortions caused by displacements of the mirror 3, and image defects. Thus, a low-cost and good-quality projection TV can be obtained.

Second Preferred Embodiment

Figure 3:
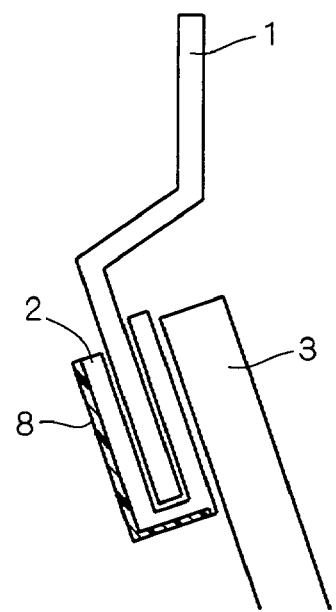
FIG. 3 is a sectional view showing the construction of a mirror holder and a mirror according to a second preferred embodiment of the present invention.

FIG. 3 is a sectional view showing the construction of the mirror holder 20 and mirror 3 according to a second preferred embodiment of the present invention. The present embodiment features subjecting a plurality of types of materials to extrusion molding at a time to obtain the mirror holder cover 2. In the present embodiment, the mirror holder cover 2 is made of two types of synthetic resin, and a surface portion 8 is made of a material of lower reflectance than other portions.

The use of such mirror holder cover 2 reduces reflection of projected light with more efficiency. Even when the low reflectance material is expensive, it is only used for the surface portion relating to reflection, so that the mirror holder cover 2 can be obtained at low cost.

In the case where the low reflectance material is not suitable for the contact with one or both of the bracket 1 and mirror 3 for some reasons, the problem can be avoided by using the low reflectance material in an area other than the contact portion.

Other construction is the same as in the first preferred embodiment, and repeated explanation is omitted here.

Third Preferred Embodiment

Figure 4:
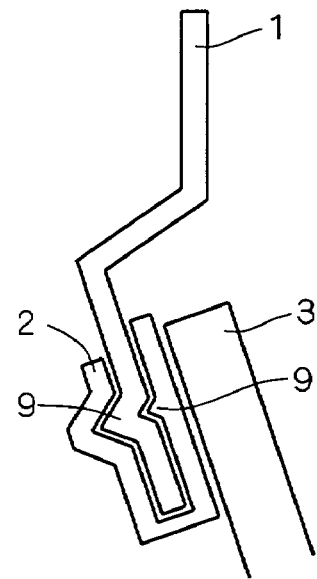
FIGS. 4 and 5 are sectional views each showing the construction of a mirror holder and a mirror according to a third preferred embodiment of the present invention.
Figure 5:
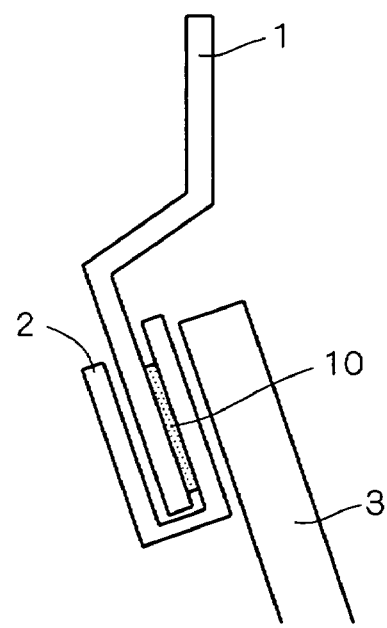

FIGS. 4 and 5 are sectional views each showing the construction of the mirror holder 20 and mirror 3 according to a third preferred embodiment of the present invention. In FIG. 4, the bracket 1 and mirror holder cover 2 are fitted with projections 9 provided at contact portions therebetween. In FIG. 5, the bracket 1 and mirror holder cover 2 are fitted with an adhesive member 10 such as an adhesive provided at a contact portion therebetween. Although not shown, the press fit employed in the first preferred embodiment may be combined with the fixing method using one or both of the projections 9 and adhesive member 10.

Such construction prevents the mirror holder cover 2 from falling off the bracket 1, and keeps the position of the mirror holder cover 2 with more reliability.

Other construction is the same as in the first preferred embodiment, and repeated explanation is omitted here.

Fourth Preferred Embodiment

FIG. 6 is a sectional view showing the construction of the mirror holder 20 and mirror 3 according to a fourth preferred embodiment of the present invention. As shown, the pad 15 is interposed between the bracket 1 and mirror 3 to support the mirror 3, and the mirror holder cover 2 formed into a special shape for reducing reflection of light as shown in FIG. 20 or 21 is attached to the bracket 1 as described in the first preferred embodiment.

Such construction eliminates the need to subject the bracket 1 to surface treatment such as coating, and allows the use of an aluminum extruded bracket or pressed sheet metal bracket, so that the mirror holder cover 2 can be obtained at lower cost.

Other construction is the same as in the first preferred embodiment, and repeated explanation is omitted here.

Fifth Preferred Embodiment

FIG. 7 is a sectional view showing the construction of the mirror holder 20 and mirror 3 according to a fifth preferred embodiment of the present invention. As shown, the mirror holder cover 2 has another square-cornered U shape part (a temporary fixing hook part 11) on one end extending from the aforementioned square-cornered U shape part. For instance, the mirror 3 is supported with its upper edge temporarily fixed to the temporary fixing hook part 11 even when the operator takes his/her hands off the mirror holder 20 when fixing the mirror holder 20 to the back cabinet 5 by screws or the like.

Figure 22:
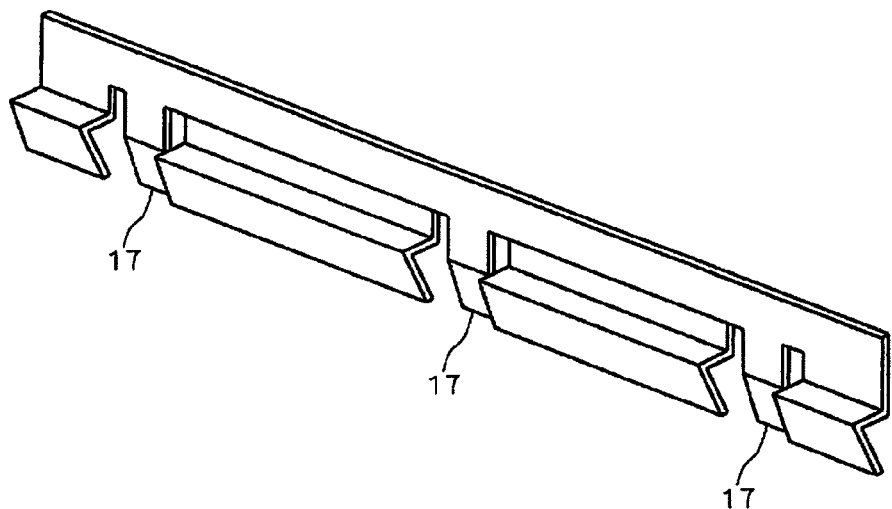
FIGS. 22 and 23 are perspective views each showing a bracket according to conventional techniques.

FIG. 20 shows a conventional bracket 1 having the temporary fixing hook part 11, and FIG. 22 is a general view of this bracket 1. When forming the temporary fixing hook part 11 on one end of the bracket 1 using pressed sheet metal, notches 17 shown in FIG. 22 are provided.

Comparing the mirror holder 20 according to the present embodiment and bracket 1 according to the conventional technique, the conventional bracket 1 made of pressed sheet metal is disadvantageous in having low strength because of the presence of the notches 17 and reflection of projected light off the cut sections of the notches 17, which result in image defects. In contrast, the notches 17 are not required in the mirror holder 20 according to the present embodiment because of the presence of the temporary fixing hook part 11 in the mirror holder cover 2. The bracket 1 can be made of pressed sheet metal because of its simple shape and obtained at lower cost than in the case of using an aluminum extruded bracket.

Further, comparing the conventional aluminum extruded bracket 1 not provided with the temporary fixing hook part 11 and the mirror holder 20 according to the present embodiment including the mirror holder cover 2 provided with the temporary fixing hook part 11 and bracket 1 made of pressed sheet metal, the cost increased by adding the temporary fixing hook part 11 in the mirror holder cover 2 made of synthetic resin is extremely lower than the cost of an aluminum material that can be reduced by simplifying the bracket 1 without providing the temporary fixing hook part 11. Therefore, the mirror holder 20 provided with the temporary fixing hook part 11 according to the present embodiment can be produced at low cost. The temporary fixing hook part 11 also serves to protect the surface of the top of the rear surface of the mirror 3 for shock absorption.

Further, when assembling the bracket 1 and mirror holder cover 2, the mirror holder cover 2, if not provided with the temporary fixing hook part 11, has to be fixed to the bracket 1 first, and then the mirror holder 20 integrally including the bracket 1 and mirror holder cover 2 is fixed to the back cabinet 5 by screws. However, the mirror holder cover 2, if provided with the temporary fixing hook part 11, can be fixed first to the mirror 3, and then, the bracket 1 can be inserted into the mirror holder cover 2 and fixed to the back cabinet 5 by screws (at which time the mirror 3 having been temporarily fixed is fully fixed), which offers alternatives in the assembly operation. Accordingly, a suitable procedure can be selected for each model, which enables optimization of assembly operation.

Other construction is the same as in the first preferred embodiment, and repeated explanation is omitted here.

Sixth Preferred Embodiment

Figure 8:
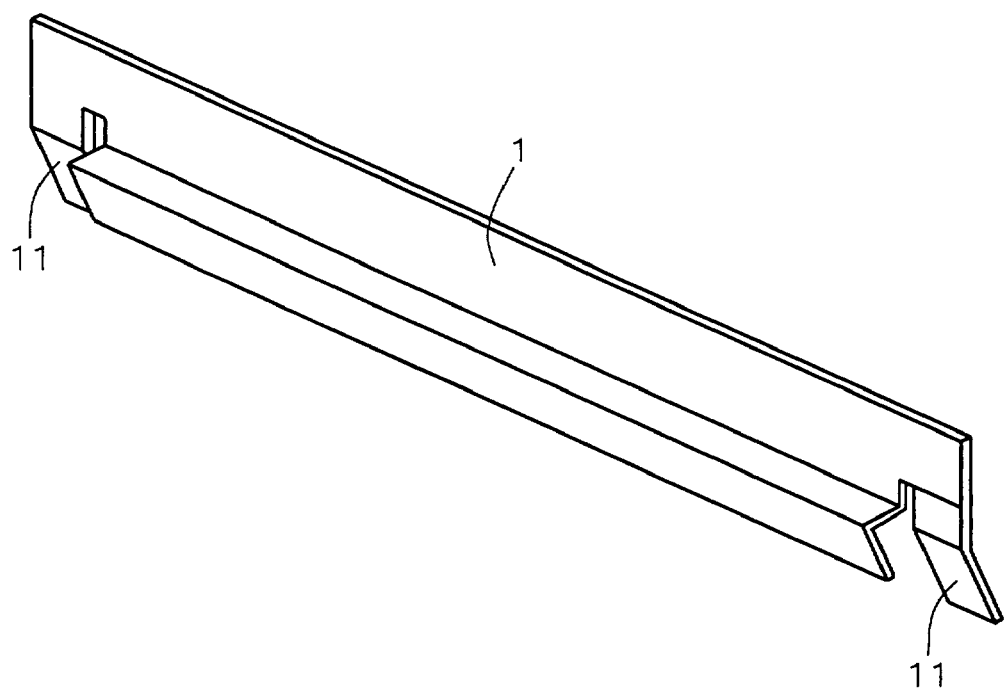
FIG. 8 is a perspective view showing the construction of a bracket according to a sixth preferred embodiment of the present invention.

FIG. 8 is a perspective view showing the construction of the bracket 1 according to a sixth preferred embodiment of the present invention. The bracket 1 made of pressed sheet metal has temporary fixing hook parts only on its opposite ends, and is not provided with the notches 17 as shown in FIG. 22. This construction reduces the cost and increases the strength of the mirror holder 20.

Other construction is the same as in the first preferred embodiment, and repeated explanation is omitted here.

Seventh Preferred Embodiment

Figure 9:
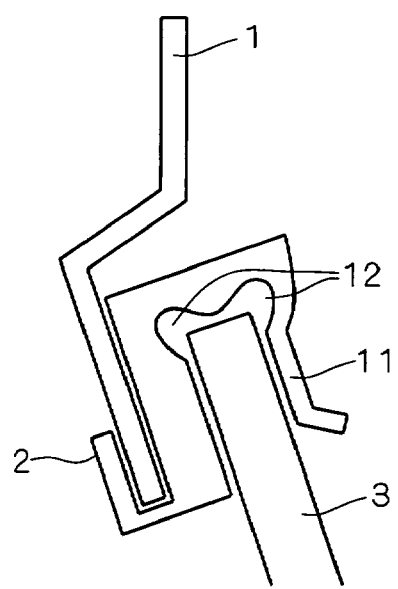
FIG. 9 is a sectional view showing the construction of a mirror holder and a mirror according to a seventh preferred embodiment of the present invention.

FIG. 9 is a sectional view showing the construction of the mirror holder 20 and mirror 3 according to a seventh preferred embodiment of the present invention. A space 12 is provided on the inner wall of the temporary fixing hook part 11 that is in contact with the edge of the mirror 3.

Such construction prevents the mirror 3 from scratching the inner wall of the mirror holder cover 2 due to vibrations during transportation of the projection TV 30. Dust, if any, such as shavings produced by such scratch inside the projection TV 30 may be adhered to the mirror 3, projection screen 7, and the like to cause image defects, however, the space 12 prevents the mirror 3 from scratching the mirror holder cover 2, which reduces dust-induced image defects.

Other construction is the same as in the first preferred embodiment, and repeated explanation is omitted here.

Eighth Preferred Embodiment

Figure 10:
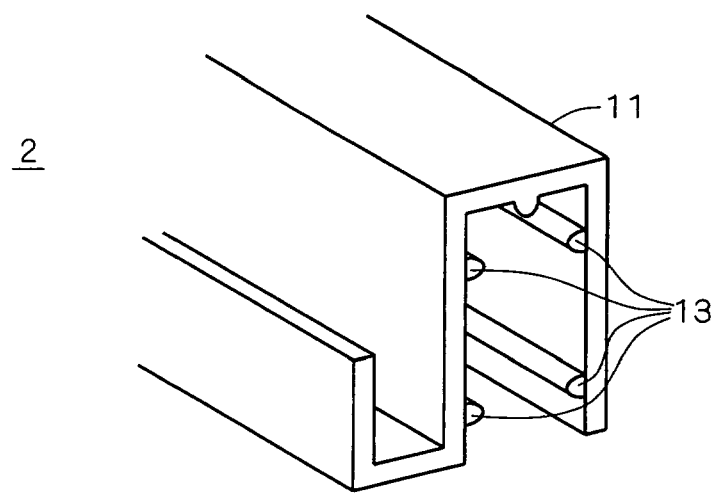
FIG. 10 is a perspective view showing the construction of a mirror holder cover according to an eighth preferred embodiment of the present invention.

FIG. 10 is a perspective view showing the construction of the mirror holder cover 2 according to an eighth preferred embodiment of the present invention. The temporary fixing hook part 11 is provided with projections 13 on its inner wall that is in contact with the mirror 3.

As the area where the inner wall of the temporary fixing hook part 11 and mirror 3 are in contact increases, the frictional resistance at the contact area increases, which may cause the mirror 3 to be displaced from the position to be originally fixed. This in turn causes problems such as image distortions or displacements.

In the seventh preferred embodiment, the space 12 is provided only on the edge of the mirror 3, and the temporary fixing hook part 11 and mirror 3 are in contact in other areas. In contrast, according to the present embodiment, providing the projections 13 on the inner wall of the temporary fixing hook part 11 further reduces the contact area between the temporary fixing hook part 11 and mirror 3 to reduce the frictional resistance against the mirror 3. This solves problems such as image distortions due to displacements of the mirror 3.

Other construction is the same as in the first preferred embodiment, and repeated explanation is omitted here.

Ninth Preferred Embodiment

Figure 11:
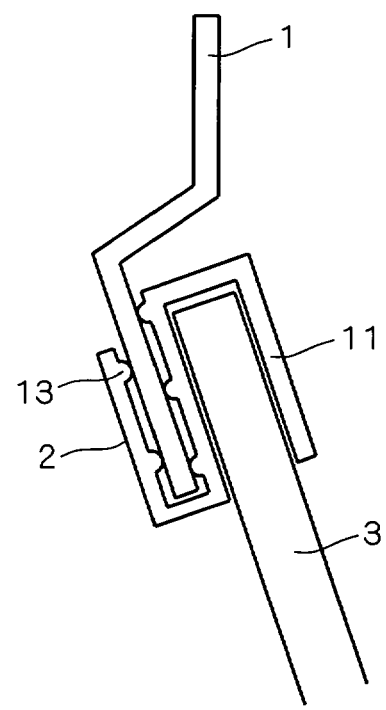
FIG. 11 is a sectional view showing the construction of a mirror holder and a mirror according to a ninth preferred embodiment of the present invention.

FIG. 11 is a sectional view showing the construction of the mirror holder 20 and mirror 3 according to a ninth preferred embodiment of the present invention. The mirror holder cover 2 is provided with projections 13 on its inner wall that is in contact with the bracket 1.

With such construction, the projections 13 on the inner wall of the mirror holder cover 2 that is in contact with the bracket 1 reduce the contact area between the bracket 1 and mirror holder cover 2 without reducing the area where the mirror 3 and mirror holder cover 2 are in contact as in the eighth preferred embodiment. This prevents the mirror 3 from being displaced.

Other construction is the same as in the first preferred embodiment, and repeated explanation is omitted here.

Tenth Preferred Embodiment

Figure 12:
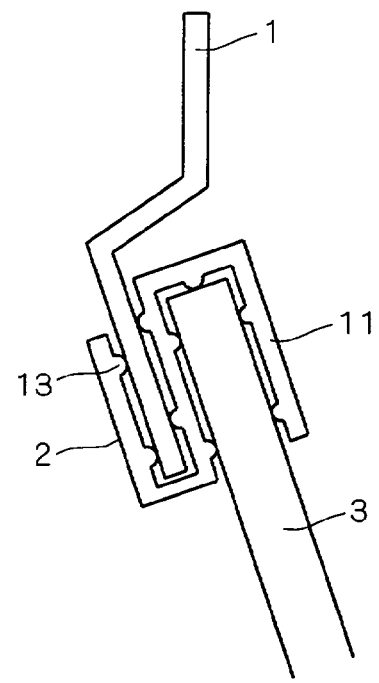
FIG. 12 is a sectional view showing the construction of a mirror holder and a mirror according to a tenth preferred embodiment of the present invention.

FIG. 12 is a sectional view showing the construction of the mirror holder 20 and mirror 3 according to a tenth preferred embodiment of the present invention. Projections 13 are provided on the inner wall of the temporary fixing hook part 11 that is in contact with the mirror 3, and on the inner wall of the mirror holder cover 2 that is in contact with the bracket 1.

This construction is a combination of the eighth and ninth preferred embodiments, which reduces the contact area between the mirror 3 and mirror holder cover 2 to prevent the mirror 3 from being displaced.

Other construction is the same as in the first preferred embodiment, and repeated explanation is omitted here.

Eleventh Preferred Embodiment

Figure 13:
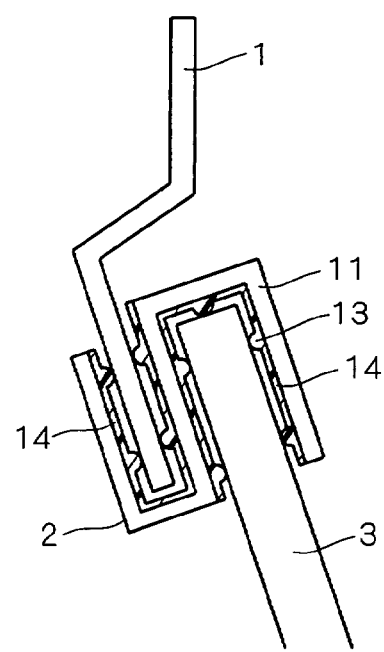
FIG. 13 is a sectional view showing the construction of a mirror holder and a mirror according to an eleventh preferred embodiment of the present invention.

FIG. 13 is a sectional view showing the construction of the mirror holder 20 and mirror 3 according to an eleventh preferred embodiment of the present invention. Projections 13 are provided on the inner wall of the temporary fixing hook part 11 that is in contact with the mirror 3, and on the inner wall of the mirror holder cover 2 that is in contact with the bracket 1. A low frictional resistance part 14 is provided on the inner walls of mirror holder cover 2 and temporary fixing hook part 11.

This construction is obtained by adding the low frictional resistance part 14 to the construction of the tenth preferred embodiment, which prevents the mirror 3 from being displaced with more reliability.

Other construction is the same as in the first preferred embodiment, and repeated explanation is omitted here.

Twelfth Preferred Embodiment

FIG. 14 is a sectional view showing the construction of the mirror holder cover 2 according to a twelfth preferred embodiment of the present invention. Projections 13 are provided on the inner wall of the temporary fixing hook part 11 to be in contact with the mirror 3, and on the inner wall of the mirror holder cover 2 to be in contact with the bracket 1. The low frictional resistance part 14 is provided on the inner walls of the mirror holder cover 2 and temporary fixing hook part 11, and the surface portion 8 on the outer wall of the mirror holder cover 2 to which projected light is applied is made up of a material of low surface reflectance.

This construction is a combination of the second and eleventh preferred embodiments, which prevents the mirror 3 from being displaced and projected light from being reflected.

Other construction is the same as in the first preferred embodiment, and repeated explanation is omitted here.

Thirteenth Preferred Embodiment

Figure 23:
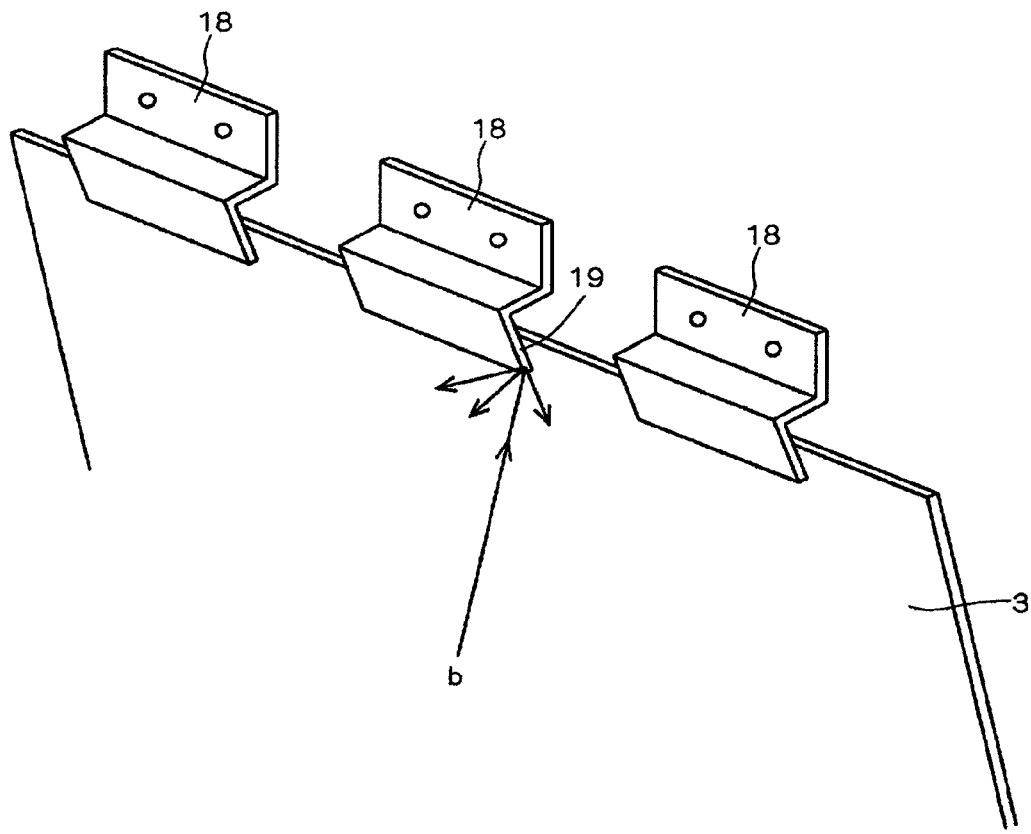

FIG. 15 is a perspective view showing the construction of the mirror holder 20 according to a thirteenth preferred embodiment of the present invention. The bracket 1 is divided into a plurality of sections and fitted into the mirror holder cover 2. FIG. 23 shows the mirror 3 supported by a bracket divided into a plurality of sections according to a conventional technique.

Comparing these constructions, small mirror holders 18 shown in FIG. 23 obtained by dividing a bracket into a plurality of sections according to the conventional technique cause light to be reflected off cut sections 19, resulting in image defects. In contrast, the construction according to the present embodiment shown in FIG. 15 prevents light from being reflected off the cut sections of the bracket 1 because of the presence of the mirror holder cover 2.

Accordingly, the small mirror holder 20 can be obtained at low cost without causing image defects due to reflection of light.

Other construction is the same as in the first preferred embodiment, and repeated explanation is omitted here.

While the invention has been shown and described in detail, the foregoing description is in all aspects illustrative and not restrictive. It is therefore understood that numerous modifications and variations can be devised without departing from the scope of the invention.

What is claimed is:

1. A projection television comprising:
   a mirror holder including a bracket made of metal fixed with its one end attached to a cabinet and a mirror holder cover made of synthetic resin having a first U shape part into which the other end of said bracket is fitted; and
   a mirror having an edge supported by said mirror holder and changing an optical path of projected light, wherein the mirror holder cover is positioned at a side of a reflection plane of the projected light of the mirror and inclined toward an image display device; and
   wherein a surface of said mirror holder cover is made of synthetic resin, selected from said plurality of synthetic resins, which has lower reflectance than other parts of said mirror holder.

2. The projection television according to claim 1, wherein said mirror holder is provided with a projection at a contact portion between said bracket and said mirror holder cover.

3. The projection television according to claim 1, wherein said mirror holder is provided with an adhesive member at a contact portion between said bracket and said mirror holder cover.

4. The projection television according to claim 1, wherein said mirror holder cover has a second U shape part on one end extending from said first U shape part, and said mirror holder supports said mirror with the edge of said mirror fitted into said second U shape part.

5. The projection television according to claim 4, wherein said mirror holder cover provides a space on an inner wall of said second U shape part that is in contact with said edge of said mirror.

6. The projection television according to claim 4, wherein said mirror holder cover has a projection on its inner wall.

7. The projection television according to claim 6, wherein said inner wall provided with said projection is the inner wall of said second U shape part.

8. The projection television according to claim 1, wherein said bracket includes a plurality of brackets.

\* \* \* \* \*